United States Patent [19]

Bayes

[11] 4,299,048
[45] Nov. 10, 1981

[54] PEST BIRD CONTROL

[76] Inventor: James W. Bayes, P.O. Box 531, 614 Metzler Ave., Molalla, Oreg. 97038

[21] Appl. No.: 150,981

[22] Filed: May 19, 1980

[51] Int. Cl.³ ............................................. A01M 19/00
[52] U.S. Cl. ......................................... 43/98; 361/232
[58] Field of Search ...................... 43/98, 99; 361/232

[56] References Cited

U.S. PATENT DOCUMENTS 3,366,854  1/1968  Robinson ................................ 43/98

FOREIGN PATENT DOCUMENTS 135179  4/1952  Sweden ................................. 43/98

Primary Examiner—James L. Jones, Jr.

[57] ABSTRACT

An electrical device for mass exterminating of objectable pest birds, such as starlings or the like; the device including an overhead cable supported between posts, the cable carrying a plurality of spaced-apart copper electrodes along its outer side, so that, when a horde of pest birds try to land upon the wire by their toes straddling it, they close an electric circuit between the electrodes, which are connected to a power source, so that the birds are thus electrocuted.

3 Claims, 7 Drawing Figures

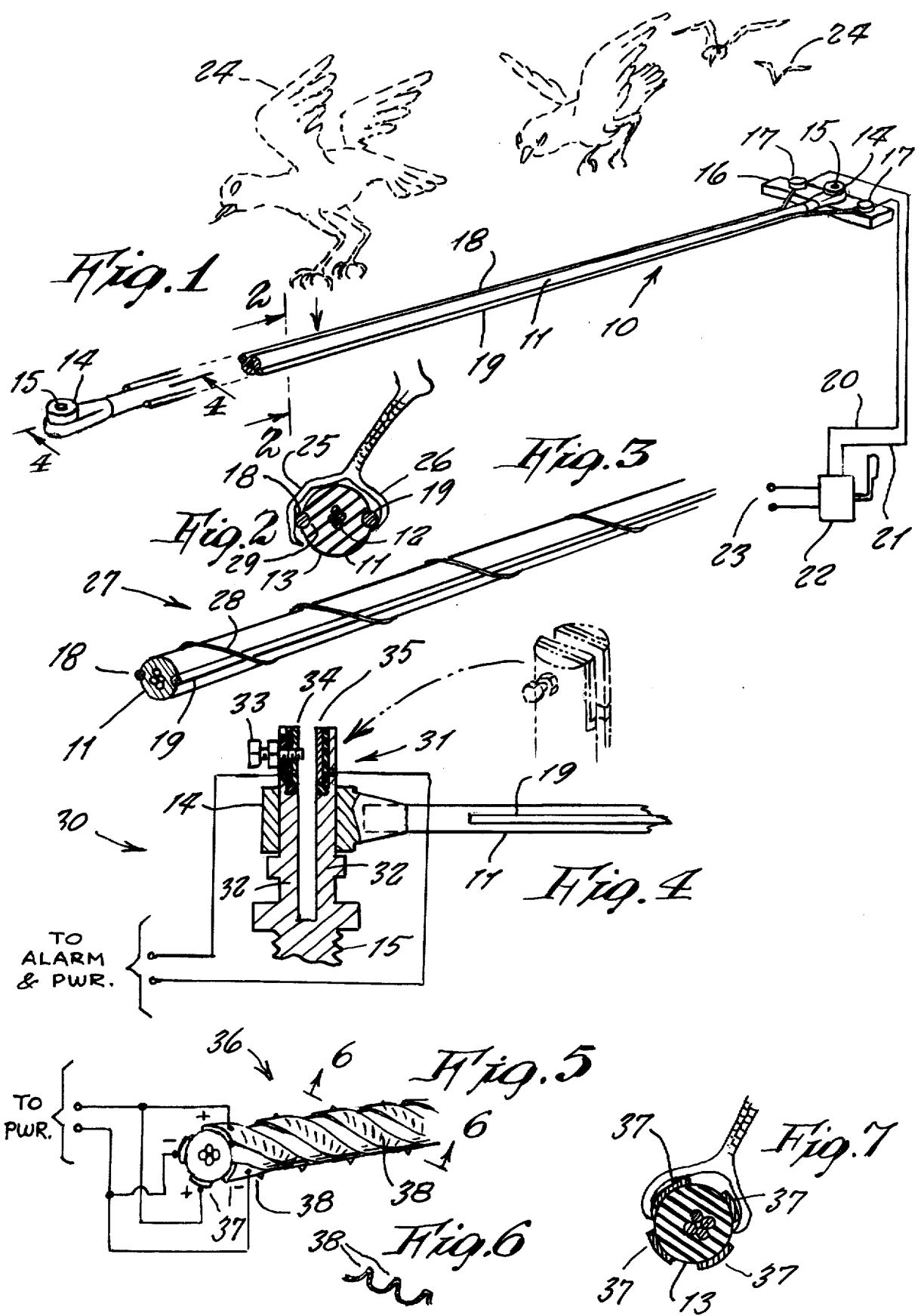

PEST BIRD CONTROL

This invention relates generally to pest control apparatus. More specifically, it relates to pest bird exterminating devices.

It is generally well known to farmers, that objectionable birds, such as starlings, which sometimes descend in hordes of thousands upon a field, can quickly destroy a crop within minutes, so that a large scale control must be used be effectively halting such rampage.

Accordingly, it is a principal object of the present invention to provide an improved pest bird control device, wherein they electrocute themselves when landing upon electrodes of an electric circuit, so that great numbers thereof can be easily eliminated in areas devastated by them.

Other objects of the present invention are to provide a pest bird control, which is simple in design, inexpensive to manufacture, rugged in construction, easy to use and efficient in operation.

These and other objects, will be readily evident upon a study of the following specification and the accompanying drawing wherein:

FIG. 1 is a perspective view of the present invention, shown positioned so that a horde of pest birds can land thereupon;

FIG. 2 is an enlarged cross-sectional view, taken on line 2—2 of FIG. 1, and showing how a landed bird closes an electric circuit;

FIG. 3 is a fragmentary perspective view of another design of the invention, wherein a wrapping around the cable secures the electrodes thereto;

FIG. 4 is an enlarged cross-sectional view, taken on line 4—4 of FIG. 1, and showing a design of automatic alarm for warning when a large number of birds have landed on the device;

FIG. 5 is a fragmentary perspective view of still another design of the device, wherein electrodes are wrapped around the cable, so as to install the cable more easily, with assurance of landing birds closing the circuit;

FIG. 6 is an enlarged cross-sectional view, on line 6—6 of FIG. 5, and

FIG. 7 is an enlarged cross-sectional view, similar to FIG. 2, and showing the structure of FIG. 5.

Referring now to the drawing in greater detail, and more particularly to FIGS. 1 and 2, an improved pest bird control device 10 is shown to include a main hanger support cable 11, made of three-sixteenths diameter, electrically non-conductive material, such as nylon strands, or else of a wire core 12, wrapped in a heavy coat of insulation 13. The cable can be up to seven hundred feet in length, and one end thereof is connected to a hanger eye bracket 14 of insulation material, and which has a bolt 15 therethrough, securing it to a cross-arm of a telephone pole. On the other end, an elongated, porcelain insulator 16, under the hanger eye bracket 14, receives the bolt 15 that is secured to the cross-arm. A bolt 17 is mounted on opposite ends of the insulator.

A copper wire 18 and 19 is partly imbedded on diametrically opposite sides of the cable, and one end of each wire is connected to one of the bolts 17.

A pair of electric conductors 20 and 21, from the two bolts 17, extend down toward the ground, where they connect to a switch 22 in circuit with a power source 23.

With switch closed, when pest birds 24 land upon the cable, so as to rest from flight, their toes 25 and 26 grasp around opposite sides of the cable, and, at a same time, contact the copper wires, so as to close the circuit, which promptly destroys the pest birds. The long cable attracts hundreds of the birds to perch thereupon, so that the large hordes thereof can thus effectively be controlled, so as to keep down their number.

In another design 27, shown in FIG. 3, the copper wires are secured to the cable by means of a thin nylon cord 28, spiralled around the cable and wires, so as to insure the wires from becoming dislodged from the cable recesses 29, thus preventing any danger of a loose-hanging, live wire.

In FIG. 4, another design 30 of the invention includes a switch 31, at one end of the cable, and which automatically closes from a great weight upon the cable, in case a great many birds land on the wire, the switch closing a circuit to an alarm, for notifying a person to close the switch 22, after first observing that the landed birds are pest birds. In this design, the switch 31 includes a pair of forked tines 32, on the upper end of one of the bolts 15, and around which the hanger eye bracket 14 is fitted, so as to cause the tines to flex together when the cable becomes heavy, so that adjustable screw 33, of one contact 34, engages the other contact 35, and closes the circuit.

In FIG. 5, still another design 36 of the invention includes a plurality of four flat copper strips 37, spiralled around the cable, so as to form alternate negative and positive pairs of electrodes connected to the above-described bolts 17. The advantage of this design is that the cable is easier to install, because there need be no regard whether the cable is tilted rotationally toward either side, (such as is important in the design 10, so that each wire 18 and 19 is at a side, instead of at the top and bottom, ir order that the bird toes reach both wires), In this design, regardless of rotational position of the cable, a bird, perched thereupon can engage two electrodes, so as to close the circuit. A row of outwardly bulged ridges 38, along each strip, provide additional broader surface contact with the bird toes; the ridges being along planes ninety degrees to the cable axis, so as to be generally parallel to the toes.

While various changes may be made in the detail construction, it is understood that such changes will be within the spirit and scope of the present invention, as is defined by the appended claims.

What I now claim is:

1. An improved pest bird control device, comprising, in combination, an overhead cable, spaced-apart positive and negative electrodes along said cable connected to a switch and a power source, and automatic warning means when a large number of pest birds have alighted upon said cable.

2. The combination as set forth in claim 1, wherein said electrodes comprise a pair of copper wires along diametrically opposite sides of said cable, and a cord securing said wires to said cable.

3. The combination as set forth in claim 1, wherein said electrodes comprise a plurality of copper strips, around said cable.